July 5, 1932. S. B. SCHNITTER 1,865,795
FLOW CHECK
Filed June 30, 1930
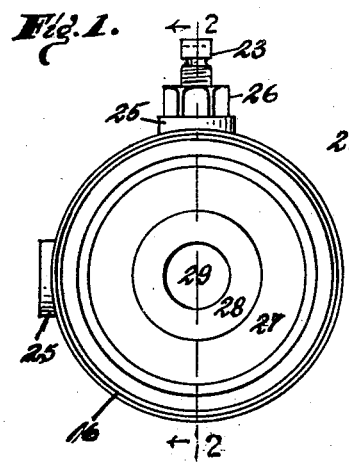
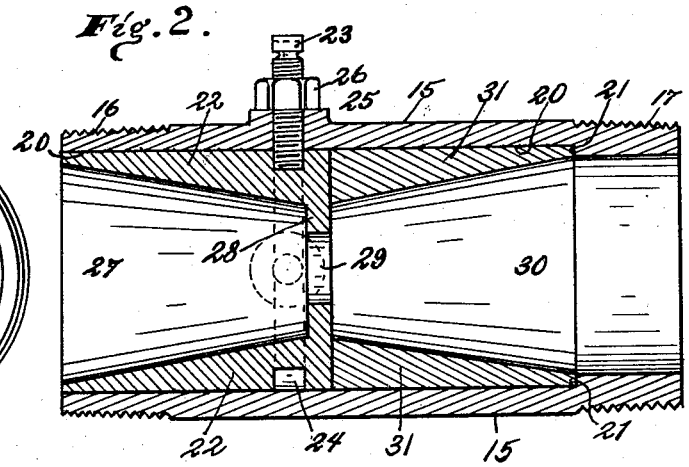
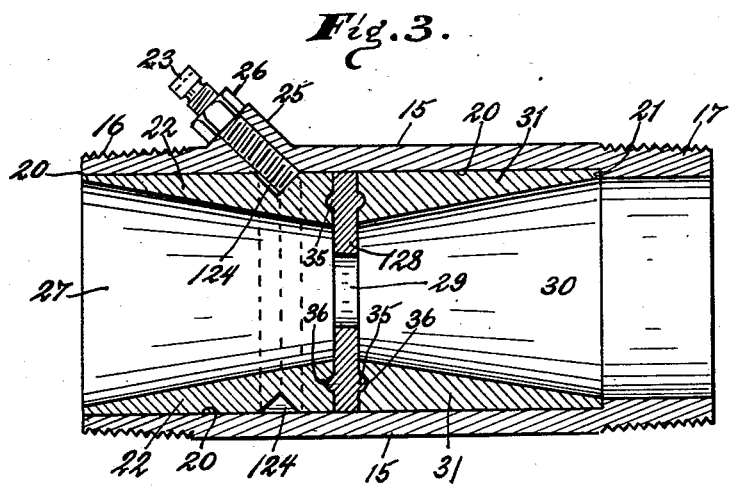
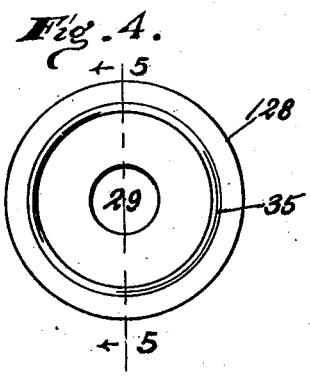
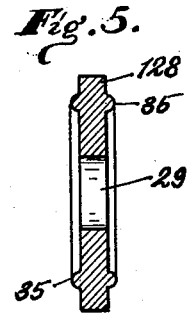
Inventor.
Sylvester B. Schnitter
by
Lockwood & Lockwood,
His Attorneys.

Patented July 5, 1932

1,865,795

UNITED STATES PATENT OFFICE

SYLVESTER B. SCHNITTER, OF MARACAIBO, VENEZUELA

FLOW CHECK

Application filed June 30, 1930. Serial No. 464,817.

This invention relates to a flow check for use in reducing the flow of fluids through pipes and the principal object is to provide a flow check that is especially adapted to reduce the flow of fluids under high pressure such as is common in petroleum wells.

To that end I provide a flow check that can be easily and quickly attached at any suitable place in a flow pipe which when connected automatically reduces the flow of fluid through the pipe to a desired flow capacity without excessive strain or wear on the flow check as its parts are constructed and arranged so as to maintain a flow balance on opposite sides of the flow check baffle plate.

Another object of the invention is to provide a flow check in which the flow capacity can be either increased or decreased by means of removable parts carrying either larger or smaller opening therethrough; and with the parts constructed and arranged so that the flow volume on opposite sides of the flow check is maintained equal.

Features of invention are shown in the construction, combination and arrangement of parts whereby a flow check is provided that is easy to construct, assemble and install and which, in use, is durable and effective to accomplish its purpose.

Other objects, advantages and features of invention may appear from the accompanying drawing, the subjoined detailed description and the appended claims.

The accompanying drawing illustrates the invention, in which:

Fig. 1 is an end view of a flow check showing a lock bolt arranged therein.

Fig. 2 is a central longitudinal section on the line 8—8, Fig. 1, showing a detailed construction of my flow check, with its lock bolt extended into an annular groove in the check head.

Fig. 3 is a view analogous to Fig. 2, showing the center baffle plate removable and also showing the lock bolt slightly inclined and extended into an annular V-shaped groove.

Fig. 4 is a side view of the baffle plate detached from the flow check.

Fig. 5 is a section on line 5—5, Fig. 4, showing the detailed construction of the baffle plate.

The flow check includes a pipe fitting 15 having its ends 16 and 17 externally threaded so it can be secured to a flow pipe not shown in the drawing but well understood in the art. It is understood that the fitting 15 can be secured in any suitable place in a flow pipe by any well known way.

The end 16 of the fitting is provided with a cylindrical bore 20 that extends centrally and longitudinally into the fitting to about its cross section where it terminates in a shoulder 21 that forms a stop for the cylindrical block 31 that has a sliding fit in the bore and is secured therein by a lock bolt 23 that extends through the fitting 15 into an annular groove 24 adjacent the inner end of the head.

There can be two or more of the lock bolts 23 and preferably they extend through raised bosses 25 integral with the fitting and after being properly adjusted so as to secure the head in the fitting they are secured in place by the nuts 26.

The check head 22 is provided with an opening 27 therein that tapers with a gradually decreasing diameter toward a baffle plate 28 that can be integral with the head as shown in Figs. 1 and 2 or separate as shown in Figs. 3, 4 and 5.

The baffle plate 28 is provided with a reduced passage 29 that opens into an opening 30 in the block 31 secured in the fitting 15, and this opening 30 is tapered reversely to the tapered opening 27.

The openings 27 and 30 are tapered substantially alike and preferably are about the same length so that in use the flow of the fluid stream therethrough is gradually reduced in diameter as it approaches the cross center of the fitting or until it reaches the baffle plate, and after passing through the reduced opening in this plate the flow diameter of the fluid stream is gradually enlarged to the full inner diameter of the flow pipe. In other words the decreasing diameter of the fluid stream as it approaches the baffle plate is substantially the same as the increasing diameter after it passes the baffle plate.

In Fig. 3 I show a slightly modified form of flow check in the respect that the baffle plate 128 is separate from the head 22 so it can be removed and replaced by another one in the event that its center opening 29 becomes too enlarged by flow of the fluid. Also in this figure I show the lock bolt 23 inclined with its inner end extended into a V-shaped groove 124 which is sufficiently large for the bolt 23 to force the head 22 endwise toward the baffle plate 128 to hold it securely against the end of the block 31. In other words by means of the inclined bolt 23 I force the parts 22, 128 and 31 toward the shoulder 21 and thereby obtain a very close fit between these parts.

Preferably the baffle plate 128 has annular beads 35 that fit snugly into annular recess 36 in the inner ends of the head 22 and block 31. It is understood of course that the baffle plate 128 can be used without the beads if so desired.

In use the flow check is secured in a flow pipe so that the flow capacity of the pipe is reduced to the flow capacity of the opening through the baffle plate with the diameter of the fluid stream reduced as it approaches the baffle to correspond to the increasing diameter of the fluid stream after it has passed the baffle plate so that when used in petroleum wells in which the fluid is under great pressure the flow is reduced to a desired quantity flow without excessive strain on the flow check.

It is understood that in use I may vary the size of the opening through the baffle plate so as to increase or decrease the flow of the fluid as may be desired and for that reason I prefer to make the baffle plate a separate part so it is easily removable to be replaced by another one with either a larger or smaller opening so as to increase or reduce the flow as may be desired.

I claim as my invention:

1. A flow check including a pipe fitting adapted to be connected to a flow pipe and having a cylindrical bore extended in from one end and terminating in a shoulder adjacent the other end thereof, a cylindrical block in the bore of said fitting having one end arranged against said shoulder and its other end terminating adjacent the cross center of said fitting, said block having an opening therethrough that tapers in a reducing diameter toward the approximate cross center of said fitting, a check head secured in the bore of said fitting with its inner end abutted against said block and having an opening therethrough tapered reversely to the tapered opening through said block, and a baffle plate having a reduced opening therethrough that connects the tapered opening through said head and block.

2. A flow check including a pipe fitting adapted to be connected to a flow pipe and having a cylindrical bore extended in from one end and terminating at a shoulder adjacent the other end thereof, a cylindrical block having one end abutted against the shoulder in said fitting and its other end terminating adjacent the cross center of said fitting, said block having an opening therethrough that tapers in a reducing diameter toward the approximate cross center of said fitting, a check head secured in the bore of said fitting with its inner end arranged adjacent said block and having an opening therethrough tapered reversely to the tapered opening through said block, and a detachable baffle plate arranged between said head and block having a reduced opening therethrough that connects the tapered openings through said head and block.

3. A flow check including a pipe fitting adapted to be connected to a flow pipe and having a cylindrical bore extended in from one end and terminating in a shoulder adjacent the other end thereof, a cylindrical block having one end abutted against the shoulder in said fitting and its other end terminating adjacent the cross center of said fitting, said block having an opening therethrough that tapers in a reducing diameter toward the approximate cross center of said fitting, a reducing head in the bore of said fitting having an annular groove adjacent its inner end, lock bolts extending through said fitting into said groove to secure said head and fitting together, said head having an opening therethrough reversely tapered to the opening through said block, and a removable baffle plate arranged between said head and block having a reduced opening therethrough that connects the tapered openings through said head and block.

4. A flow check including a pipe fitting adapted to be connected to a flow pipe and having a cylindrical bore extended in from one end and terminating in a shoulder adjacent the other end thereof, a cylindrical block having one end abutted against the shoulder in said fitting and its other end terminating adjacent the cross center of said fitting, said block having an opening therethrough that tapers in a reducing diameter toward the approximate cross center of said fitting, a reducing head in the bore of said fitting having an annular groove adjacent its inner end, inclined lock bolts extended through said fitting into said groove so as to force said head toward said block and secure them in said fitting, said head having an opening therethrough reversely tapered to the opening through said block, and a removable baffle plate arranged between said head and block having a reduced opening therethrough that connects the tapered openings through said head and block.

5. The combination set forth in claim 4 and, beads on the sides of said baffle plate arranged to extend into recesses in the ends of said head and block.

In witness whereof, I have hereunto affixed my signature.

SYLVESTER B. SCHNITTER.